Aug. 6, 1929.  H. THIEL  1,723,389
DEVICE FOR PUTTING UNDER TENSION THE TOOLS OF FILING,
SAWING, AND SIMILAR MACHINES AND MACHINE TOOLS
Filed April 3, 1929
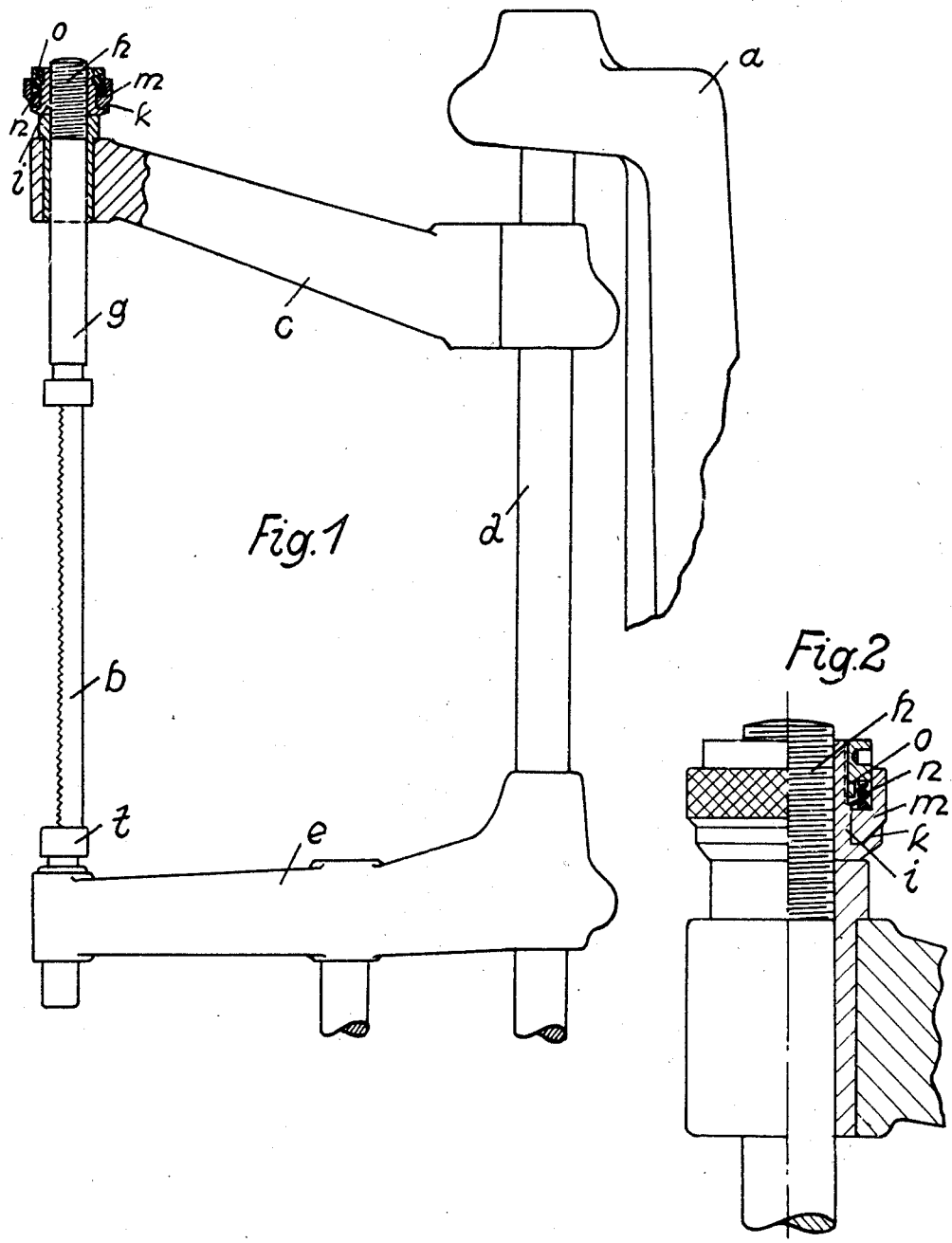
Inventor
Heinrich Thiel
attorney Patented Aug. 6, 1929.

1,723,389

UNITED STATES PATENT OFFICE.

HEINRICH THIEL, OF RUHLA, GERMANY.

DEVICE FOR PUTTING UNDER TENSION THE TOOLS OF FILING, SAWING, AND SIMILAR MACHINES AND MACHINE TOOLS.

Application filed April 3, 1929, Serial No. 352,227, and in Germany March 1, 1928.

With machine tools, such as filing and sawing machines and the like, the tool is generally attached to a bow or bow-like member and put under tension therein by tightening a nut. This procedure is disadvantageous in that there is no certainty as to when the proper degree of tension has been attained so that it is no rare occurrence that the respective tool is damaged, especially torn.

Detrimental occurrences of this and similar kinds are completely obviated by the present invention, the characteristic feature of which is this that a friction clutch is inserted into the tensioning device in such a manner that the tensioning procedure can be continued only as long as the clutch members remain coupled with one another, but are disengaged instantly when the resistance has reached or exceeds a certain predetermined maximum. In this moment the tensioning means proper goes out of action so that the tool is securely prevented from any damage.

The invention is illustrated diagrammatically and by way of example on the accompanying drawing on which Figure 1 is a side-view of a tensioning device designed for use in connection with a sawing machine, and Fig. 2 is partly (lefthand part) a side-view of, and partly (righthand part) an axial section through, the members shown in the lefthand upper corner of Fig. 1, Fig. 2 being drawn to a greatly enlarged scale relatively to Fig. 1.

On the drawing, $a$ denotes a part of the frame of the machine, and $b$ is the tool which is a saw-blade in this case. The blade is clamped fast in a bow composed of the members $c$, $d$ and $e$ and is guided vertically by said frame. The blade $b$ is clamped fast at its lower end by any suitable means such as a clamp dog $t$ which is either firmly attached to the member $e$ of the bow or adjustably attached thereto. The upper end of the blade is attached by any suitable means to an axially movable bolt $g$ located in the member $c$ of the bow.

The uppermost portion of the bolt $g$ is screw-threaded and carries a nut $i$ by which the bolt is moved axially when it is turned. At the lower end of the nut is a flange $k$, the rim of which is directed upwardly so as to form a circular groove, and in this groove is located a ring $m$, the lower part of which is shaped in conformity with said groove, as distinctly shown in Fig. 2.

Also the upper portion of the nut $i$ is threaded, and on this thread is a smaller or outer nut $o$ engaging a circular recess provided in the upper portion of the ring $m$, and in this recess is housed a helical spring $n$ bearing at its upper end on an outer shoulder of the nut $o$ and at its lower end on an inner shoulder of the ring $m$, in consequence whereof the conical lower end of this ring is pressed into the conical groove of the nut $i$.

Owing to the friction thus produced between the nut $i$ and the ring $m$ the nut is turned automatically by the ring when this latter is turned manually, and when the ring is turned in counter-clockwise direction the blade is put under tension. This procedure can be continued until the resistance to further tensioning of the blade has become greater than the friction between the members $k$ and $m$. From this moment the nut $k$ comes to a standstill and the further tensioning action ceases.

As the spring $n$ bears against the nut $o$ its pressure can be varied or adjusted by turning said nut in the one or the other direction, but the pressure with which the conical portion of the member $m$ is pressed into the groove of the member $k$ can be varied also by exchanging the spring $n$ for a weaker or a stronger one.

I wish it to be understood that I do not limit myself to all details of the constructional form shown merely by way of example in the drawing. For instance, instead of conical friction faces flat or cylindrical ones can be used, the means for guiding the bow ($c$, $d$, $e$) or its equivalent may differ from that shown in the drawing, the tool may be, for instance, a file or the like.

I claim:

A device for preventing overtensioning of a tool in a machine tool comprising a nut having an externally threaded portion and a conical flange and an internally threaded portion adapted to cooperate with a tool securing bolt of the machine tool; a ring provided around said nut adjacent the flange, having a shoulder and forming a spaced portion with the nut; an outer nut threaded on the screwthreaded portion of the first nut and having a shoulder thereon; and a spring arranged between the shoulders in the spaced portion and adapted to force the ring on the flange for frictional contact therewith whereby rotation of the ring will rotate the first nut through the frictional contact until the first nut offers more resistance than the frictional contact.

In testimony whereof I affix my signature.

HEINRICH THIEL.